United States Patent [19]

Brown

[11] 4,389,151
[45] Jun. 21, 1983

[54] CONTROL LEVER ARRANGEMENT

[75] Inventor: David J. Brown, Manchester, England

[73] Assignee: Massey-Ferguson Services N.V., Curacao, Netherlands Antilles

[21] Appl. No.: 302,482

[22] PCT Filed: Dec. 29, 1980

[86] PCT No.: PCT/GB80/00225
§ 371 Date: Sep. 8, 1981
§ 102(e) Date: Sep. 8, 1981

[87] PCT Pub. No.: WO81/02209
PCT Pub. Date: Aug. 6, 1981

[30] Foreign Application Priority Data

Jan. 26, 1980 [GB] United Kingdom ............... 8002724
May 27, 1980 [GB] United Kingdom ............... 8017209

[51] Int. Cl.³ .............................................. G05G 13/00
[52] U.S. Cl. ............................... 414/685; 74/471 XY; 180/333
[58] Field of Search ............... 74/471 XY, 471 R; 414/680, 685, 687, 694; 180/333; 91/413, 414, 459

[56] References Cited

U.S. PATENT DOCUMENTS

| 2,818,746 | 1/1958 | Hart | 74/471 R X |
| 3,319,817 | 5/1967 | Juhl et al. | 180/333 X |
| 3,893,346 | 7/1975 | Paul | 74/471 XY X |
| 4,054,083 | 10/1977 | Utter | 74/471 R X |
| 4,098,286 | 7/1978 | Prime | 74/471 XY X |
| 4,140,144 | 2/1979 | Dowd et al. | 414/685 X |

Primary Examiner—Robert J. Spar
Assistant Examiner—Terrance L. Siemens
Attorney, Agent, or Firm—John C. Thompson

[57] ABSTRACT

A twin control lever arrangement for the control of three functions such as hydraulic valves. The arrangement includes a first control lever (10) mounted on a first mounting means (12) for pivoting about first (A) and second (B) perpendicular axes to operate first and second functions respectively and a second control lever (13) mounted on a second mounting means (15) for pivoting about a third axis (C) aligned with the first axis (A) and a fourth axis (D) parallel to the second axis (B). Pivoting of the second lever (13) about the third axis (C) operates the third function and a link member (32) extends generally perpendicularly to the two control levers (10,13) to operatively connect the levers by way of pivotal connections at both ends of the link member so that the two levers pivot together about the second and fourth axes to allow either lever to operate the second function.

10 Claims, 6 Drawing Figures

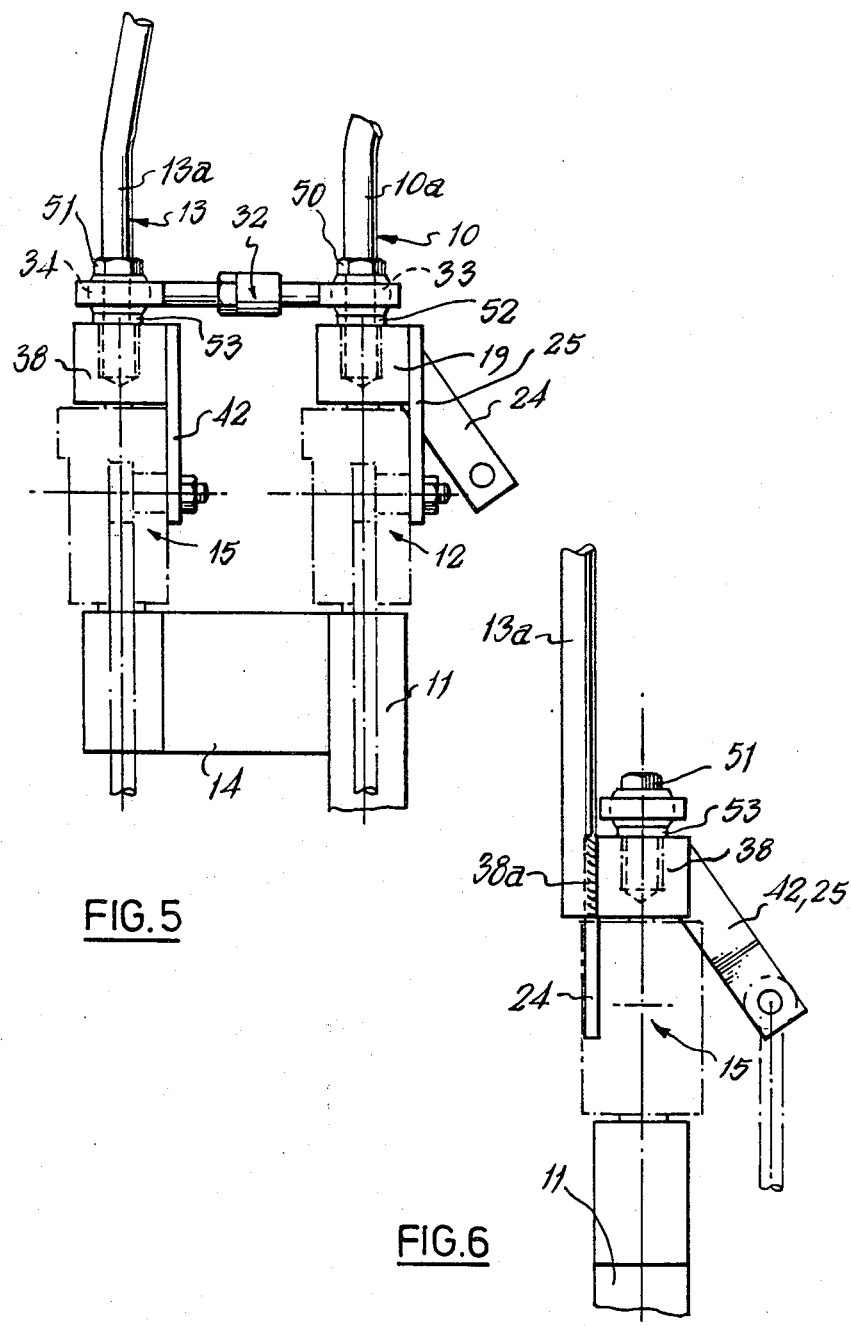

CONTROL LEVER ARRANGEMENT

TECHNICAL FIELD

This invention relates to twin control lever arrangements for the control of three functions in such a manner that either control lever can be used to control a particular one of the three functions. In particular, though not exclusively, the invention is directed to a twin control lever arrangement for controlling three hydraulic valves.

Several twin control lever arrangements of the above type have previously been proposed but none of these has been of a simple, economic and reliable construction.

DISCLOSURE OF THE INVENTION

It is an object of the present invention to provide a twin lever control arrangement which overcomes the above shortcomings.

Thus according to the present invention there is provided a twin control lever arrangement for the control of three functions comprising a first control lever mounted on a first mounting means for pivoting about first and second perpendicular axes to operate first and second functions respectively, a second control lever mounted on a second mounting means for pivoting about a third axis aligned with said first axis and a fourth axis parallel to said second axis, pivoting of said second lever about said third axis operating said third function, and a link member extending generally perpendicularly to the two control levers to operatively connect said levers by way of pivotal connections at both ends of the link member, whereby the two levers pivot together about said second and fourth axis to allow either lever to operate said second function but said first lever can pivot about said first axis to operate said first function without causing sufficient movement of said second lever about said third axis to operate said third function and said second lever can pivot about said third axis to operate said third function without causing sufficient movement of said first lever about said first axis to operate said first function.

Such a twin control lever arrangement is particularly suitable for the control of three hydraulic valves which operate a four-in-one bucket fitted to a front end loader on an industrial tractor. In such an application pivoting of the first control lever about the first axis could be arranged to control a first valve which controls the raising and lowering of loader support beams, pivoting of the first or second lever about the second or fourth axis could be arranged to control a second valve which controls the rolling-back and emptying of the bucket, and pivoting of the second lever about the third axis could be arranged to control a third valve which controls the opening and closing of the four-in-one bucket. Thus either lever could be used to control the rolling-back and emptying of the bucket.

A particularly convenient arrangement is provided if the two levers are close enough together to be spanned by one hand.

Such control lever may comprise a lower portion mounted on a main universal joint and an upper handle portion supported by the lower portion, and in which the link member extends between the handle portions of the control levers. Alternatively the link member may extend between the lower portions of the control levers.

The link member may be adjustable in length to facilitate installation and fine adjustment of the twin lever arrangement.

The first control lever may be mounted on a stand and the second control lever mounted on an arm supported from said stand.

The levers can be connected with the three functions by any appropriate means, for example rods or cables.

Two examples of twin control lever arrangements embodying the present invention, for the control of three spool valves on a loader of an industrial tractor, will now be described, by way of example only, with reference to the accompanying drawings in which:

DESCRIPTION OF THE DRAWINGS

FIGS. 5 and 6 show side and end views of a further form of twin control lever arrangement embodying the present invention.

BEST MODE OF CARRYING OUT INVENTION

Figure 1:
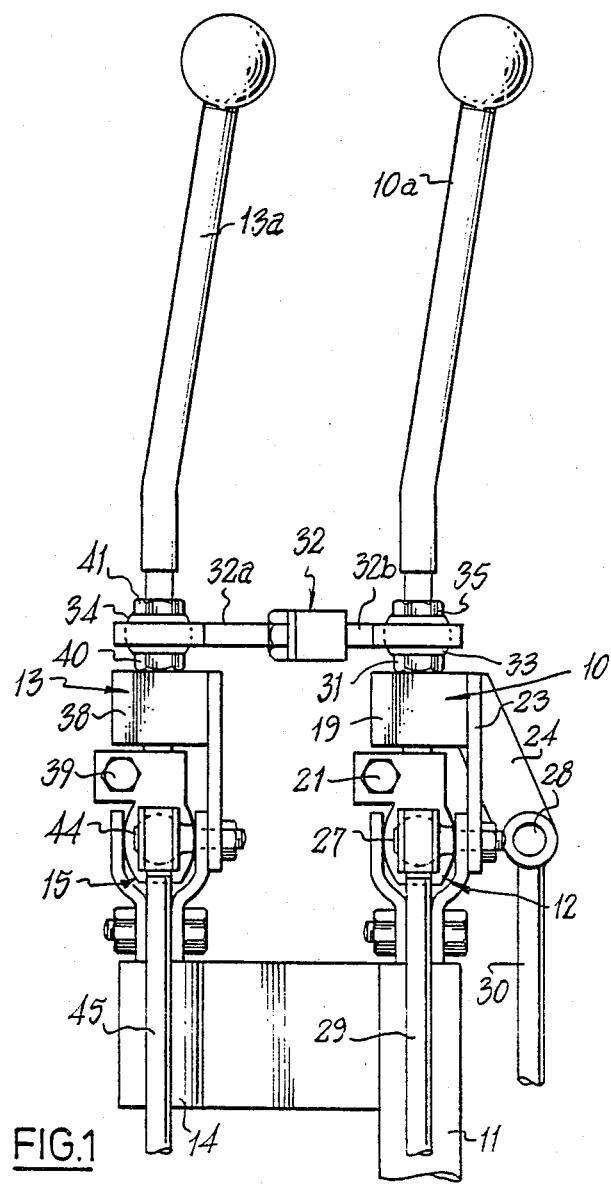
FIG. 1 is a general view of a twin control lever arrangement embodying the present invention.

A first control lever 10, comprising an upper handle portion 10a and a lower portion in the form of a block 19, is mounted on a support stand 11 via a main universal joint 12 which allows pivoting of the lever 10 relative to the stand 11 about first and second intersecting and perpendicular axes A and B respectively. In a similar manner a second control lever 13 comprising a upper handle portion 13a and a lower portion in the form of a block 38, is mounted on an arm 14 carried by the stand 11 via a second main universal joint 15 which allows pivoting of the second control lever 13 relative to the arm 14 about third and fourth intersecting and perpendicular axes C and D respectively. Axes A and D are aligned while axes B and C are parallel.

Figure 2:
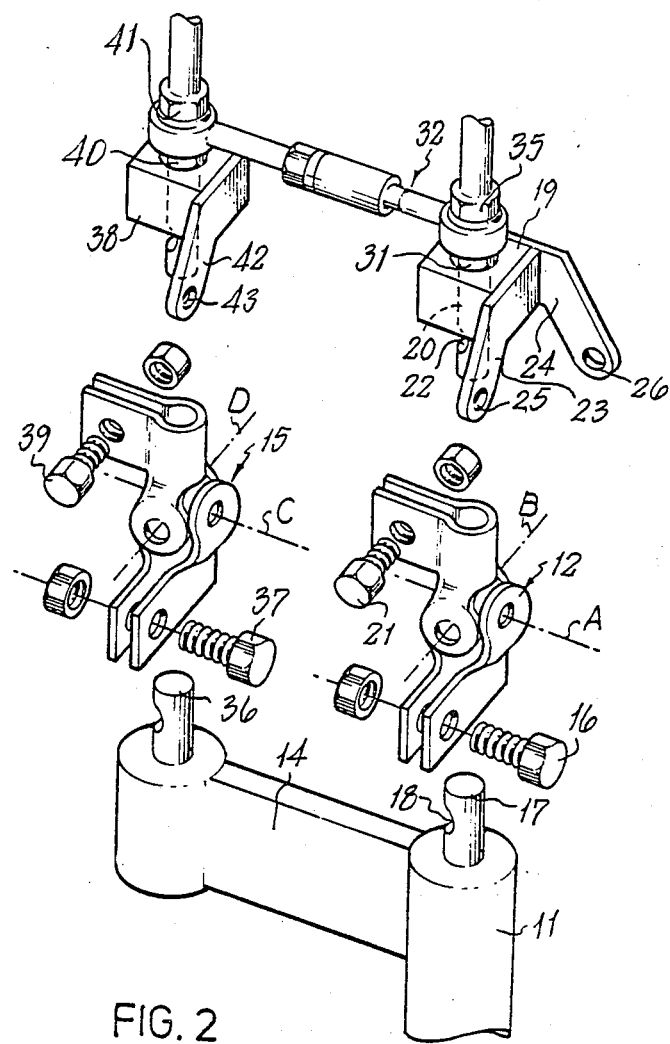
FIG. 2 is an exploded isometric view of the twin control lever arrangement of FIG. 1.

As can be more clearly seen from FIG. 2 universal joint 12, which is of the type often used in car steering columns, is clamped by a pinch bolt 16 onto a projecting stub 17 provided at the upper end of stand 11.

Stub 17 is provided with a cut-out 18 which partially receives the pinch bolt 16 and prevents rotation of the universal joint relative to the stand 11.

In a similar manner block 19 has a downwardly projecting stub 20 which is secured to the upper part of the universal joint 12 by a pinch bolt 21 which partially extends into a cut-out 22 in the stub 20 to prevent rotation of the block 19 relative to the upper part of the universal joint.

Two arms 23 and 24 are welded to perpendicular faces of block 19 and extended downwardly. Apertures 25 and 26 in arms 23 and 24 mount universal joints in the form of ball joints 27 and 28 respectively which connect the arms to valve operating rods 29 and 30 respectively. The centre of ball joint 27 is arranged to lie on axis B while the centre of ball joint 28 lies on Axis A.

Handle portion 10a is screwed into block 19 and held tight therein by a locking nut 31. Control lever 10 is interconnected with control lever 13 by a link member 32 which is mounted at its ends on the handle portion 10a and 13a via ball joints 33 and 34 respectively.

The ball joint 33 is sandwiched between the locking nut 31 and a further locking nut 35.

The link member 32 is of a two part construction in which part 32a is screwed into part 32b to allow adjustment of the effective length of the link member by relative rotation of the two parts. This allows fine adjustment of the control lever arrangement to take up manufacturing inaccuracies etc. and to generally facilitate installation of the control lever arrangement on the tractor.

The second control lever 13 is mounted on the arm 14 in a similar manner to the mounting of the control lever 10 on the stand 11. Thus the second main universal joint 15 is mounted on a stub 36 by a pinch bolt 37 while block 38 which supports handle portion 13a is secured to the upper part of joint 15 by a pinch bolt 39. Locking nuts 40 and 41 duplicate the functions of nuts 31 and 35 previously described in relation to control lever 10.

A single arm 42 extends from the block 38 and is provided with an aperture 43 which supports a universal joint in the form of ball joint 44 whose centre lies on axis C and which connects the arm 42 with a further valve operating rod 45.

The twin control lever arrangement shown in the accompaying drawings is for use in the operation of three spool valves (not shown) which control a front end loader fitted to an industrial tractor and employing a four-in-one bucket.

Valve operating rod 29 is connected with a spool valve which controls the raising and lowering of the loader beams, operating rod 30 is connected with the spool valve which controls the rolling-back and emptying of the loader bucket, and operating rod 45 is connected with the spool valve which controls the opening of the four-in-one bucket.

Figure 4:
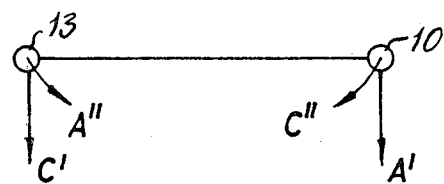
FIG. 4 diagrammatically illustrates in plan view how the two levers move relative to each other in response to certain control movements.

Pivoting of lever 10 about axis A as indicated by arrow A in FIG. 4 causes raising or lowering of the loader beams (depending on the direction of this rotation) without producing any movement of rod 30 since ball joint 28 lies on axis A. Because of the interconnection of lever 13 with lever 10 via the link member 32, movement of the lever 10 in the direction A' of FIG. 4 causes a small amount of arcuate movement of lever 13 as indicated by arrow A" in FIG. 4. This movement is arranged to be insufficient to displace the rod 45 sufficiently to operate the four-in-one valve.

In a similar fashion pivoting of control lever 13 about axis C as indicated by arrow C' in FIG. 4 causes movement of valve operating rod 45 via arm 42 to open and close the four-in-one bucket. This movement C' of the control lever 13 causes a small arcuate movement C" of lever 10 which is again arranged not to cause sufficient movement of rods 29 and 30 to operate the associated valves.

Thus pivoting of lever 10 about axis A operates the beam control valve only while pivoting of lever 13 about axis C operates the four-in-one valve only.

As will be appreciated pivoting of lever 10 about axis B displaces valve operating rod 30 to operate the bucket roll-back and emptying control valve without moving rod 29 since ball joint 27 is on axis B.

In view of the presence of the link member 32 which interconnects control levers 10 and 13 any movement of either of these control levers about axes B and D respectively results in a corresponding parallel movement of the other control lever. Thus pivoting of the lever 13 about axis D causes pivoting of lever 10 about its axis B and thus again displaces rod 30 to operate the bucket roll-back and emptying control valve. Thus the bucket roll-back and emptying control valve can be operated either directly from lever 10 or from lever 13 via link member 32.

Conveniently the spacing between the two levers 10 and 13 is arranged to allow both levers to be spanned by one hand. This enables the tractor operator to have complete control of the front end loader without needing to transfer his hand from one lever to another.

In order to reduce the arcuate movements A" and C" which occur in response to the pivoting of levers 10 and 13 about axes A and C it is desirable to keep to a minimum the vertical distance X between the mounting points 33 and 34 if the link member 32 on the handle portions of the control levers and the point of intersection of the pivot axes of the control levers. These arcuate movements can also be kept small by increasing the spacing Y between the control levers 10 and 13. Thus the distance X is kept to a minimum and the spacing Y kept to the maximum which conveniently allows both levers to be controlled by a single hand.

A further significant feature of the control lever arrangment of the present invention is that the second control lever 13 and its support arm 14 etc. can easily be arranged to be mountable on the stand 11 of lever 10 as an add-on feature. Thus, for example, the standard tractor could be offered with stand 11 and control lever 10 only for the control of a loader not having a four-in-one bucket and the additional control lever 13 and its support arm 14 could be fitted, either in the factory or by the distributor or customer, if it was desired to use a four-in-one bucket.

In an alternative construction (not shown) handle portions 10 and 13 are welded to blocks 19 and 38 respectively and the locking nuts 31, 35, 40 and 41 are replaced by circlips which engage the handle portions above and below the joints 33 and 34 to locate the link member 32.

Figure 3:
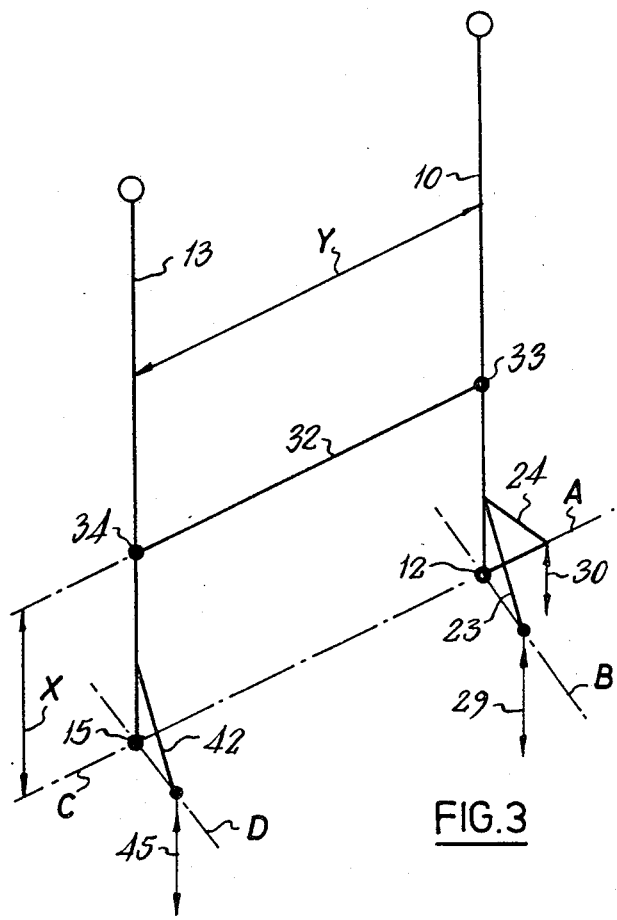
FIG. 3 is a diagrammatic representation of the twin lever control arrangement.

In a further alternative, construction shown in FIGS. 5 and 6, in which components of similar function to those shown in FIGS. 1 to 3 have been similarly numbered, the handle portions 10a and 13a are welded to the blocks 19 and 38 at 19a and 38a respectively.

The link member 32 is provided with ball joints 33 and 34 at its ends and these are screwed to blocks 19 and 38 using set screws 50 and 51 (or alternatively socket-headed screws) and spacing washers 52 and 53 respectively. Washers 52 and 53 ensure that joints 33 and 34 are capable of the necessary amount of pivotal movement without fouling blocks 19 and 38. The same anti-fouling effect could alternatively be achieved by chamfering the tops of blocks 19 and 38 and omitting washers 52 and 53.

The remaining constructional details of the twin lever control arrangement of FIGS. 5 and 6 and its connection with the associated hydraulic valves are the same as those described above in relation to FIGS. 1 to 3 and will not therefore be repeated.

The arrangement of FIGS. 5 and 6 has the advantage that the handle portions of control levers 10 and 13 will not tend to unscrew from blocks 19 and 38 when in use (this would loosen the fastening of the link 32). Also the lever 13, associated joint 15, arm 14 and link 32 can more easily be provided as an add-on feature since this does not entail any modification or removal of the lever 10 and its mount but simply requires the attachment of the link 32 using screw 50 into a tapped hole which could already be provided in block 19.

I claim:

1. A twin control lever arrangement for the control of three functions characterised by comprising a first control lever (10) mounted on a first mounting means (12) for pivoting about first (A) and second (B) perpendicular axes to operate first and second functions respectively, a second control lever (13) mounted on a second mounting means (15) for pivoting about a third axis (C) aligned with said first axis (A) and a fourth axis (D) parallel to said second axis (B), pivoting of said second lever (13) about said third axis (C) operating said third function, and a link member (32) extending generally perpendicularly to the two control levers (10, 13) to operatively connect said levers by way of pivotal connections (33, 34) at both ends of the link member, whereby the two levers pivot together about said second (B) and fourth (D) axes to allow either lever to operate said second function but said first lever (10) can pivot about said first axis (A) to operate said first function without causing sufficient movement of said second lever (13) about said third axis (C) to operate said third function and said second lever (13) can pivot about said third axis (C) to operate said third function without causing sufficient movement of the said first lever (10) about said first axis (A) to operate said first function.

2. A control lever arrangement according to claim 1 characterised in that the first control lever (10) carries first (23) and second (24) arms for connection with the first and second functions via first (27) and second (28) universal joints lying on the second (B) and first (A) axes respectively, and in that the second control lever (13) carries a third arm (42) for connection with the third function via a third universal joint (44) lying on the fourth axis (D).

3. A control lever arrangement according to claim 1 or claim 2 characterised in that each control lever (10, 13) comprises a lower portion (19, 38) mounted on a main universal joint (12, 15) and an upper handle portion (10a, 13a) supported by the lower portion, and in that the link member (32) extends between the handle portions (10a, 13a) of the control levers.

4. A control lever arrangement according to claim 3 characterised in that the handle portion (10a, 13a) of each control lever is provided with a threaded portion part of which is screwed into the respective lower control lever portion (19, 38) and held fast therein by a first locking nut (31, 40) which engages the threaded portion and the lower lever portion, the associated end of the link member (32) being mounted on the threaded portion of the handle portion by a ball joint (33, 34) held between the first locking nut (31, 40) and a second locking nut (35, 41) received on the threaded portion.

5. A control lever arrangement according to claim 1 or claim 2 characterised in that each control lever (10, 13) comprises a lower portion (19, 38) mounted on a main universal joint (12,15) and an upper handle portion (10a, 13a) supported by the lower portion, and in that the link member (32) extends between the lower portions (19, 38) of the control levers.

6. A control lever arrangement according to claim 5 characterised in that the handle portion (10a, 13a) of each control lever is welded (19a, 38a) to the lower portion (19, 38) and the associated end of the link member (32) is mounted on the lower portion by a ball joint (33, 34) which is attached to the lower portion (19, 38) by screw-threaded attachment means (50, 51).

7. A control lever arrangement according to any one of claims 1 to 6 characterised in that the control levers (10, 13) are close enough together (Y) to be spanned by one hand.

8. A control lever arrangement according to any one of claims 1 to 6 characterised in that the link member (32) is adjustable (32a, 32b) in length.

9. A control lever arrangement according to any one of claims 1 to 6 characterised in that the first control lever (10) is mounted on a stand (11) and the second control lever (13) is mounted on an arm (14) supported from said stand.

10. A control lever arrangement according to any one of claims 1 to 6 for the control of the three hydraulic valves which operate a loader provided with a four-in-one bucket, the arrangement being characterised in that pivotting of the first control lever (10) about the first axis (A) is arranged to operate a first valve which controls the raising and lowering of loader support beams, pivotting of the first (10) or second (13) control lever about the second (B) or fourth (D) axis operates a second valve which controls the rolling-back and emptying of the bucket, and pivotting of the second lever (13) about the third axis (C) operates a third valve which controls the opening and closing of the four-in-one bucket.

* * * * *